United States Patent
Matsushita

(10) Patent No.: US 10,550,926 B2
(45) Date of Patent: Feb. 4, 2020

(54) PULLEY ASSEMBLY WITH MODULE PLATE

(71) Applicant: HI-LEX CONTROLS, INC., Rochester Hills, MI (US)

(72) Inventor: Masayuki Matsushita, Rochester Hills, MI (US)

(73) Assignee: HI-LEX CONTROLS, INC., Rochester Hills, MI (US)

( * ) Notice: Subject to any disclaimer, the term of this patent is extended or adjusted under 35 U.S.C. 154(b) by 82 days.

(21) Appl. No.: 16/015,284

(22) Filed: Jun. 22, 2018

(65) Prior Publication Data
US 2019/0390757 A1 Dec. 26, 2019

(51) Int. Cl.
| | |
|---|---|
| *F16H 55/54* | (2006.01) |
| *F16H 57/00* | (2012.01) |
| *F16H 19/06* | (2006.01) |
| *E05F 11/48* | (2006.01) |
| *B60J 1/17* | (2006.01) |

(52) U.S. Cl.
CPC ........ *F16H 57/0031* (2013.01); *E05F 11/483* (2013.01); *F16H 19/06* (2013.01); *B60J 1/17* (2013.01); *E05Y 2900/55* (2013.01)

(58) Field of Classification Search
CPC .... F16H 57/0031; F16H 19/06; E05F 11/483; E05F 2900/55; B60J 1/17
See application file for complete search history.

(56) References Cited

U.S. PATENT DOCUMENTS

| | | |
|---|---|---|
| 5,904,002 A | 5/1999 | Emerling et al. |
| 6,546,674 B1 | 4/2003 | Emerling et al. |
| 7,097,231 B2 | 8/2006 | Rhodes et al. |
| 8,136,866 B2 | 3/2012 | Broadhead |
| 8,196,350 B2 | 6/2012 | Arimoto et al. |
| 8,839,566 B2 | 9/2014 | Deschner |
| 9,580,953 B1 | 2/2017 | Matsushita |
| 2008/0098655 A1 | 5/2008 | Valentage |
| 2009/0265993 A1 | 10/2009 | Shah et al. |
| 2015/0345697 A1 | 12/2015 | Nebreda De La Iglesia et al. |
| 2016/0036287 A1 | 2/2016 | Hazel et al. |

FOREIGN PATENT DOCUMENTS

| | | | | |
|---|---|---|---|---|
| DE | 102006018138 A1 | * | 10/2007 | ............ E05F 11/483 |
| DE | 102008024742 A1 | * | 11/2009 | ............ B60J 5/0416 |
| EP | 1 243 452 A1 | | 9/2002 | |
| WO | WO 2005/075226 A1 | | 8/2005 | |
| WO | WO 2008/054453 A1 | | 5/2008 | |

* cited by examiner

*Primary Examiner* — Lori L Lyjak
(74) *Attorney, Agent, or Firm* — Brinks Gilson & Lione

(57) ABSTRACT

A window regulator assembly for a motor vehicle includes a pulley assembly with integrated module plate for redirecting a cable. The pulley assembly includes a base element and a cable pulley rotatably coupled with the base element. The base element has a pair of fingers and a stepped area for engaging with an integrated module plate. The integrated module plate has a pulley assembly receiving site for placing the pulley assembly. The pulley assembly receiving site of the integrated module plate has at least one aperture, a slot and a mating portion for easily engaging with the pulley assembly. The mating portion includes a third support surface for supporting the edge of the stepped area of the base element.

12 Claims, 3 Drawing Sheets

PULLEY ASSEMBLY WITH MODULE PLATE

FIELD

The present application relates to a pulley assembly for use with an integrated module plate potentially suited for various applications but in a preferred implementation is utilized in an automotive window regulator assembly.

BACKGROUND

This statements in this section merely provide background information related to the present disclosure and may not constitute prior art. Passenger car and light truck motor vehicles feature movable side door glass. A mechanism is required to move the glass between the upper closed position and the lower opened position. These mechanisms are generally known as window regulators. Window regulators can be manually operated, or can be driven by a power actuator, most commonly employing an electric motor. One type of window regulator uses a pulley arrangement having a metal cable wrapped around a drum driven by an electric motor. These devices use carriers movable along guide rails which engage the door glass which is a driven by the metal cable to control its motion.

The pulley assemblies provided for cable driven window regulator systems are available in numerous configurations. Generally, the pulley assemblies attached or coupled to the guide rail on a module plate are provided to rotate about an axis of rotation for changing a direction of the metal cable. Various fastening elements such as screws or stepped pins are used for rotatable attachments, which are guided centrally through the cable pulley assemblies.

As a result of the driving forces by a motor or as a result of a movement of the door glass, furthermore, relatively large forces such as a bending moment acting on the attached cable pulley in the window regulator systems are supported by the pulley assembly in the guide rail. Generally, the fastening elements are used for supporting the large forces on the cable pulley are used. We have discovered, however, that the pulley assembly with the fastening elements in the window regulator systems will take more manufacturing process steps for its assembly. Accordingly, there is constantly a desire to simplify the assembly. In addition, there is more desire to reduce cost and weight of automotive components, while providing a desirable durability, low warranty claims, and compliance with performance requirements.

The above information disclosed in this Background section is only for enhancement of understanding of the background of the present disclosure and therefore it may contain information that does not form the prior art that is already known to a person of ordinary skill in the art.

SUMMARY

The present disclosure generally provides a pulley assembly for use with an integrated module plate in a window regulator for redirecting a cable. The pulley assembly includes a base element having a body, a first portion and a second portion. The first portion has a finger and the second portion has a stepped area. A cable pulley rotatably couples with the base element for redirecting the cable. An integrated module plate has a pulley assembly receiving site for coupling with the pulley assembly. The pulley assembly receiving site has an aperture for engaging with the finger, a slot for allowing the stepped area to pass through, and a mating portion for engaging with an edge of the stepped area of the base element. The mating portion includes a third support surface, which supports the edge of the stepped area of the base element.

According to one aspect of the present disclosure, the finger of the base element is extended from the body in generally parallel to the pulley assembly receiving site and placed through the aperture of the pulley assembly receiving site. The body of base element includes a hole, which allows a pulley screw to pass through when the cable pulley is rotatably attached to the base element. The stepped area of the base element has a L-shape structure, and the L-shape stepped area is placed into the mating portion through the slot of the pulley assembly receiving site.

According to an aspect of the present disclosure, the base element further includes a cable retention tab, which is generally extended from the body of the base element for preventing the cable from being removed from the cable pulley. The mating portion of the pulley assembly receiving site has a C-shape channel structure and is configured for receiving the edge of the stepped area of the base element.

According to an aspect of the present disclosure, the pulley assembly receiving site further includes a first support surface near the aperture and a second support surface on the slot. In an assembled configuration, the clipped-in pulley assembly is retained to the integrated module plate by engaging with the support surfaces before the cable is tensioned. Furthermore, in the assembled configuration with the cable, a resultant force exerted by a driving force of the cable on the base element presses against each of the first, second and third support surfaces of the pulley assembly receiving site.

According to an aspect of the present disclosure, the cable pulley is arranged on the base element along a connecting axis extending in a direction from the cable pulley to the base element for mounting the cable pulley. The cable pulley is rotatably mounted on an upper surface of the base element by the pulley screw, a washer and a nut. The pulley assembly receiving site further includes a central opening for allowing the pulley assembly to place on the pulley assembly receiving site without interferance when the pulley assembly is installed to the pulley assembly receiving site.

Further areas of applicability will become apparent from the description provided herein. Everyone should understand that the description and specific examples presented herein are for the purpose of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
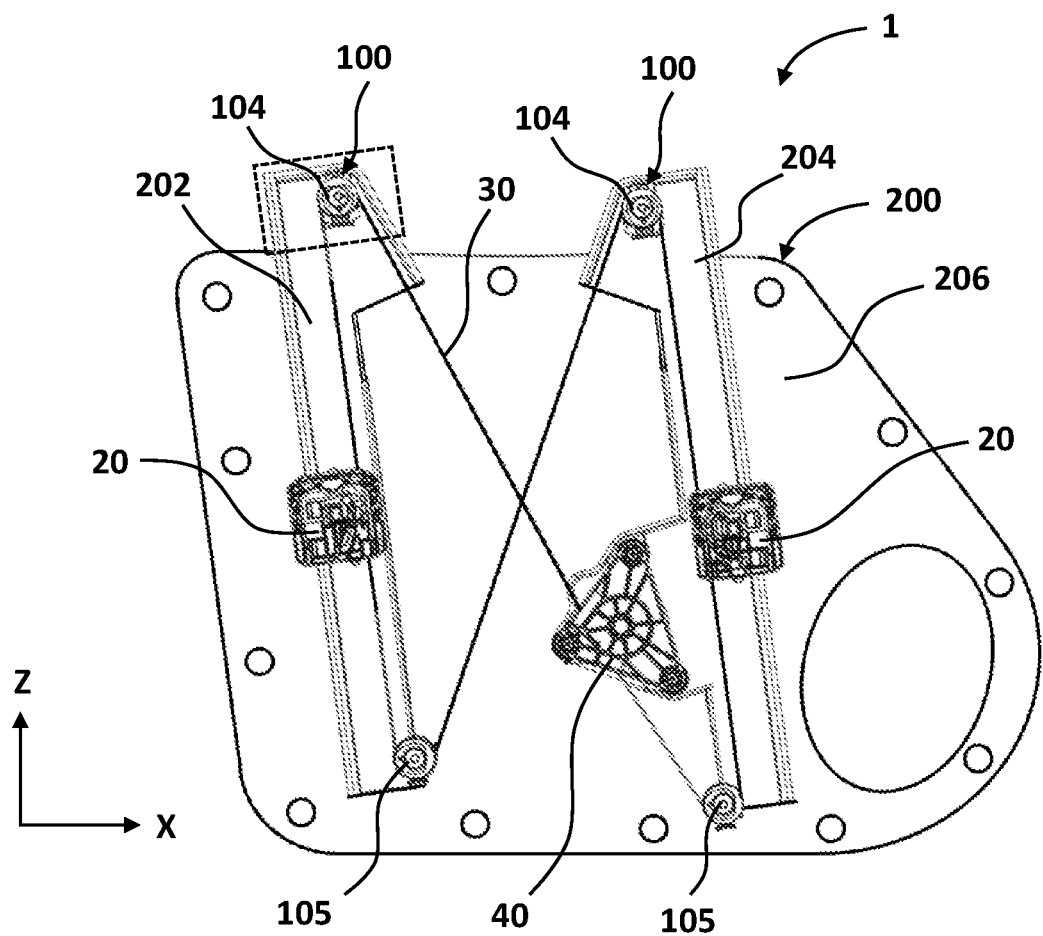
FIG. 1 is a perspective view of a window regulator assembly for redirecting a cable in accordance with the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. It should be understood that throughout the drawings, corresponding reference numerals indicate like or corresponding parts and features.

FIG. 1 illustrates a window regulator assembly 1 in a motor vehicle. The window regulator assembly 1 shown in FIG. 1 includes a module plate 206, a first guide rail 202 and a second guide rail 204 oriented parallel to each other. On the window regulator assembly 1, both guide rails 202, 204 extend from a lower end to an upper end slightly inclined with respect to a vertical Z-axis, i.e. in the assembled condition, both guide rails 202, 204 are slightly inclined with respect to the vehicle axis pointing from the bottom of the vehicle to the top of the vehicle. As shown in FIG. 1, the guide rails 202, 204 may be extended over a top edge of the module plate 206. Accordingly, the upper end of the guide rails 202, 204 is hanging over the module plate 206. However, other suitable shapes in accordance with other forms of the present disclosure may be implemented.

As shown in FIG. 1, both guide rails 202, 204 are used as a guide for the movement of a window between open and closed position. The guide rails 202, 204 are generally attached to the module plate 206 as found in a conventional window regulator assembly. As shown in FIG. 1, however, the guide rails 202, 204 are preferably integrally formed with the module plate 206. The guide rails 202, 204 is unitarily formed as a single piece with the module plate 206. Accordingly, an integrated module plate 200 defines the integrally formed guide rails 202, 204 with the module plate 206 as a single piece and is made from a thermoplastic material in order to reduce weight and to simplify integration with and provide support for other components in the window regulator assembly 1.

In FIG. 1, the window regulator assembly 1 includes window carriers 20, a cable 30 and a driving unit 40. Each of the window carriers 20 is engaged with the guide rails 202, 204 and caused to travel up and down along the guide rails 202, 204. In addition, the window carriers 20 include a window clamp arrangement (not shown) which is engaged with the window. Each window carrier 20 is attached or connected to the cable 30. Such attachments or connection may be made by clamps, fasteners, adhesives, press fitting, snap fittings, or any other means.

As shown in FIG. 1, the drive unit 40 may be manually operated via a hand crank mechanism or powered, most commonly done using an electric motor (not shown) attached to a set of gears, such as worm and spur gears. The drive unit 40 interacts with the cable 30 to provide the cable tension necessary to cause the window carriers 20 and the window (not shown) to move between its open and closed positions. Furthermore, the drive unit 40 may be attached to the integrated module plate 200.

In FIG. 1, the unitarily formed guide rails 202, 204 each includes a pulley assembly 100 coupled to the upper end of each of the guide rails 202, 204 and a second cable pulley 105 is engaged with the lower end of each of the guide rails 202, 204. However, other suitable arrangements in accordance with other forms of the present disclosure may be implemented. According to another aspect of the present disclosure, the pulley assembly 100 may be also coupled to the lower end of each of the guide rails 202, 204 in addition to the upper end of the guide rails 202, 204.

As shown in FIG. 1, at the lower end of the guide rails 202, 204, the second cable pulley 105 is directly or indirectly connected to the guide rails 202, 204 through an attachment method such as a fastener. However, other suitable attachment methods such as clamps, adhesive, press-fittings, snap fittings, or any other means in accordance with other forms of the present disclosure may be implemented. In addition, FIG. 1 also illustrates the pulley assembly 100 coupled to the upper end of the guide rails 202, 204.

Figure 2:
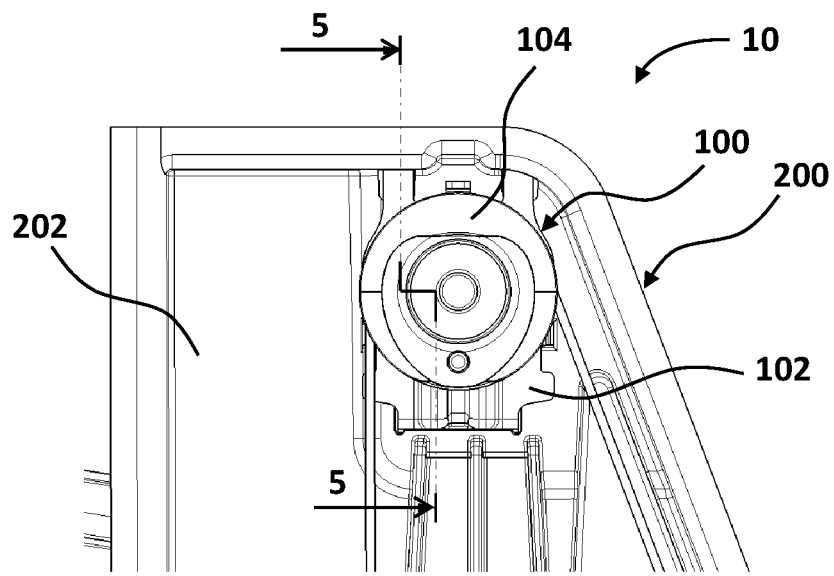
FIG. 2 is an enlarged view of a pulley assembly with integrated module plate in the window regulator assembly of FIG. 1 in accordance with the present disclosure.

FIG. 2 shows an enlarged view of the engaged pulley assembly 100 with the guide rail 202 of the integrated module plate 200 at the upper end of the guide rail 202. In FIG. 1, since the pulley assembly 100 on the upper end of the first guide rail 202 has the same feature and configuration as the pulley assembly 100 on the upper end of the second guide rail 204, the description of the pulley assembly 100 on the second guide rail 204 is omitted. A cable pulley 104 in the pulley assembly 100 is attached to the guide rail 202 by coupling with a base element 102. The base element 102 engaged with the cable pulley 104 is coupled to the guide rail 202 of the integrated module plate 200 by a clip-in method. However, other suitable methods in accordance with other forms of the present disclosure may be implemented.

Referring back to FIG. 1, the cable pulleys 104, 105 serve as redirecting element for the cable 30. As shown in FIG. 1, a driving force transmitted via the cable 30 is redirected via the cable pulleys 104, 105. The cable pulleys 104, 105 are arranged and rotated along a connecting axis Y vertical to substantially in the XZ-plane. Accordingly, the window engaged with the window carriers 20 can be adjusted, i.e. raised and lowered by the window regulator assembly 1.

Figure 3A:
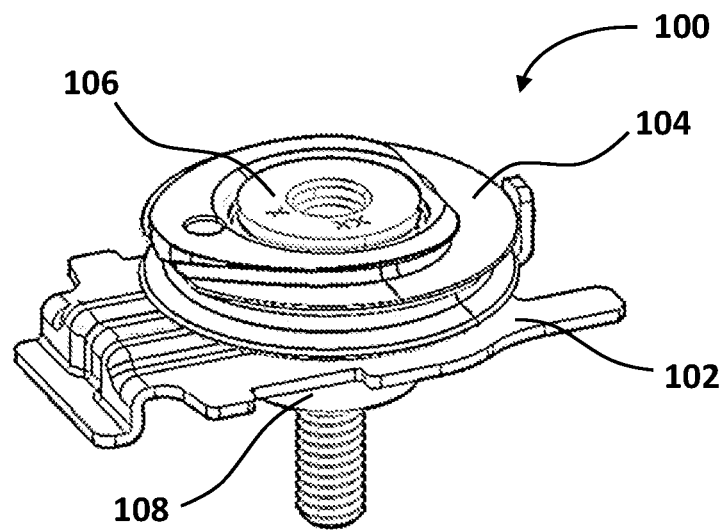
FIG. 3A is a perspective view of a pulley assembly.
Figure 3B:
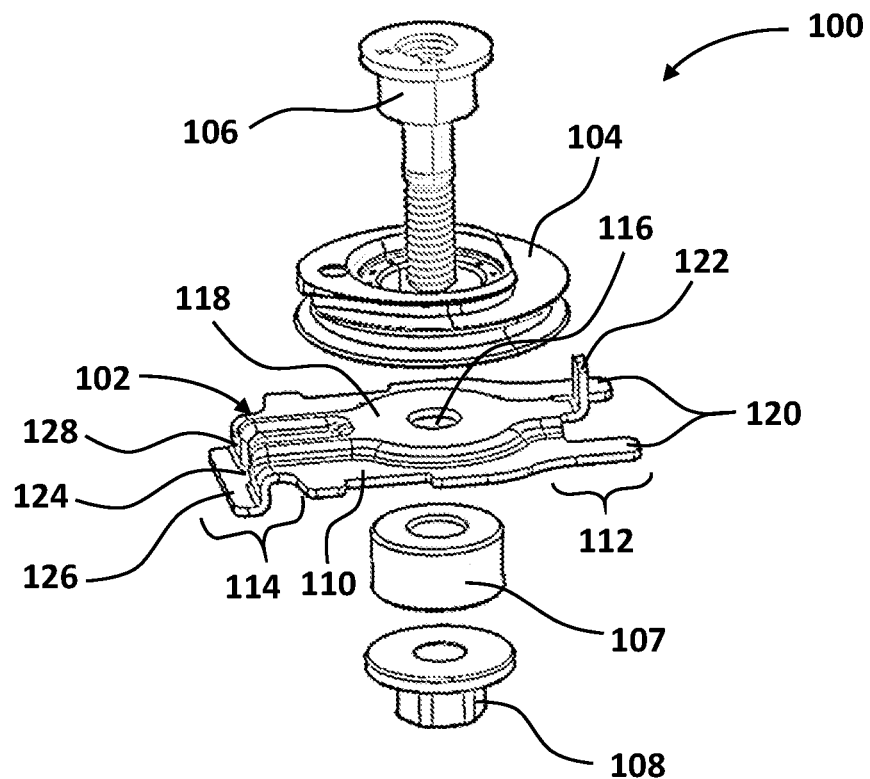
FIG. 3B is an exploded view of the pulley assembly of FIG. 3A in accordance with the present disclosure.

FIGS. 3A and 3B illustrate the pulley assembly 100 engaged with the upper end of each of the guide rails 202, 204 as shown in FIG. 1. The pulley assembly 100 includes the base element 102, the cable pulley 104, a pulley screw 106, a washer 107 and a nut 108. The base element 102 further includes a body 110, a first portion 112 and a second portion 114. The body 110 has a hole 116 for allowing the pulley screw 106 to pass through the hole 116 when the cable pulley 104 is attached on the base element 102. The pulley screw 106 is assembled with the washer 107 and the nut 108. The assembled pulley screw 106 allows the cable pulley 104 freely to rotate relative to the connecting axis Y. Accordingly, the cable pulley 104 is placed on an upper surface 118 of the base element 102 and freely rotated relative to the connecting axis Y (see FIG. 5).

As shown in FIGS. 3A and 3B, the first portion 112 of the base element 102 has a pair of fingers 120 extended from the body 110 on the XZ-plane, which is a generally parallel plane as the module plate 206 (see FIG. 2). In addition, the first portion 112 of the base element 102 further includes a cable retention tab 122 generally extended from the body 110. In particular, the cable retention tab 122 is transversely extended from the body on the XZ-plane. The cable retention tab 122 is generally located between the both fingers 120 of the base element 102. The cable retention tab 122 covers a circumferential groove of the cable pulley 104 after the cable pulley 104 is installed to the base element 102. In this way, it is prevented that after the assembly the cable 30 can inadvertently be removed from the groove of the cable pulley 104 in radial or axial direction.

In FIGS. 3A and 3B, a stepped area 124 is formed on the second portion 114 of the base element 102 in an opposite end of the first portion 112 and generally defines L-shape. However, other suitable shapes in accordance with other form of the present disclosure may be implemented. The base element 102 is generally made of a hard material, preferably a steel. As shown in FIG. 2, furthermore, the stepped area 124 and the fingers 120 of the base element 102 are coupled to the guide rail 202 of the integrated module plate 200.

Figure 4:
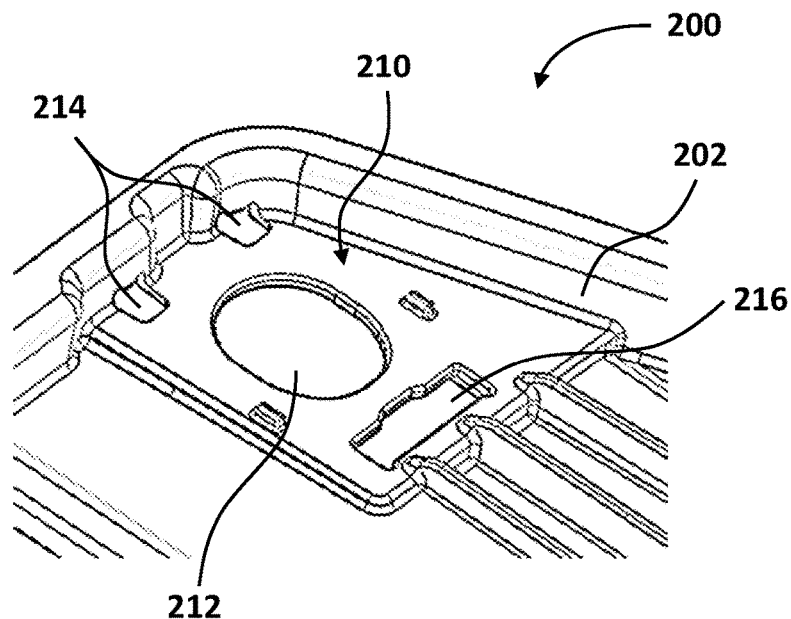
FIG. 4 is a perspective view of a pulley assembly receiving site of the upper end of the guide rail in accordance with the present disclosure.

FIG. 4 illustrates the upper end of the guide rail 202 on the integrated module plate 200. The upper end of the guide rail 202 has a pulley assembly receiving site 210 including a central opening 212, a pair of apertures 214 and a slot 216. The central opening 212 is located at the center of the pulley assembly receiving site 210 and configured for allowing the fastened washer 107 and nut 108 of the pulley assembly 100 to place through the central opening 212 when the pulley assembly 100 is installed to the guide rail 202 of the integrated module plate 200. Accordingly, the pulley assembly 100 can be easily installed to the integrated module plate 200 without any interference due to the central opening 212.

As shown in FIG. 4, the apertures 214 are located near the top area of the pulley assembly receiving site 210 and are configured for receiving the fingers 120 of the base element 102 when the pulley assembly 100 is installed to the guide rail 202 of the integrated module plate 200. In addition, the slot 216 defines a generally rectangular shape and is located at the bottom area of the pulley assembly receiving site 210. The stepped area 124 of the base element 102 is placed through the slot 216 of the pulley assembly receiving site 210 when the pulley assembly 100 is installed to the integrated module plate 200.

Figure 5:
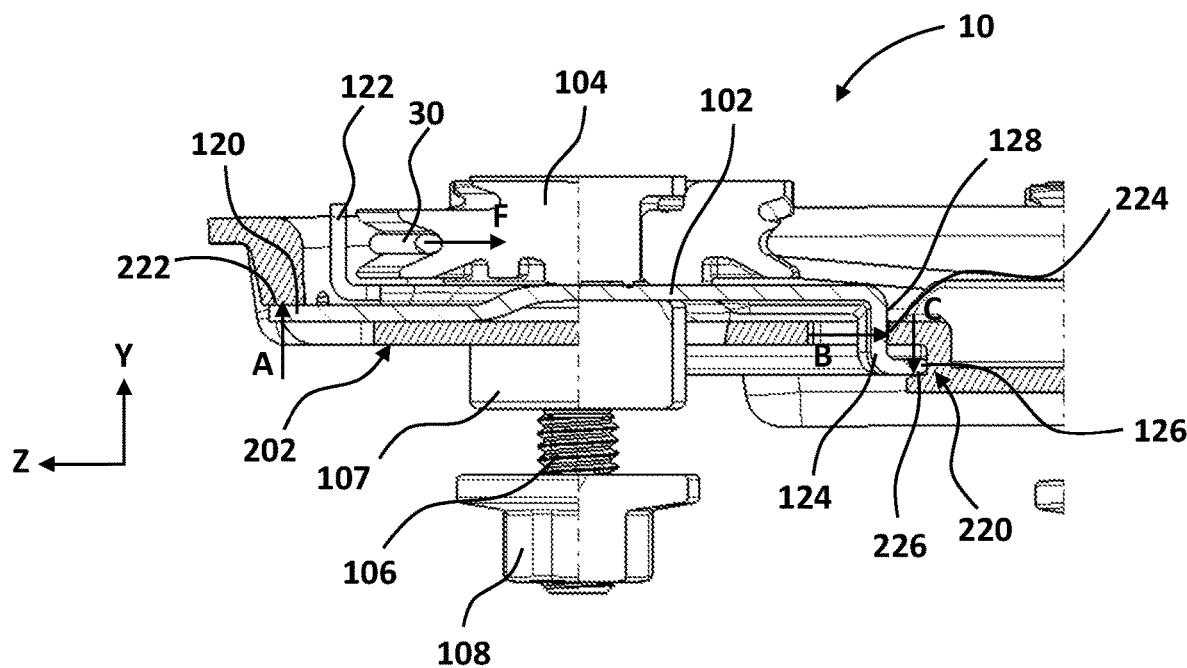
FIG. 5 is a cross-sectional view of the pulley assembly with integrated module plate of FIG. 2, taken along line 5-5 of FIG. 2.

FIGS. 2, 4 and 5 illustrates the pulley assembly with integrated module plate 10. FIG. 2 is a perspective view of the pulley assembly with integrated module plate 10 and FIG. 5 is a cross section view of the pulley assembly with integrated module plate 10 of FIG. 2, taken along line 5-5 of FIG. 2. As shown in FIG. 5, the pulley assembly receiving site 210 of the guide rail 202 includes a mating portion 220 at the bottom area of the pulley assembly receiving site 210. The mating portion 220 of the pulley assembly receiving site 210 defines as a generally C-channel shape as shown in FIG. 5. However, other suitable shapes in accordance with other forms of the present disclosure may be implemented. The mating portion 220 is configured for receiving the L-shaped stepped area 124 of the base element 102 inside the C-channel of the mating portion 220. Accordingly, an edge 126 of the L-shaped stepped area 124 is placed inside the mating portion 220 of the pulley assembly receiving site 210 through the slot 216. Advantageously, the pulley assembly receiving site 210 including the C-channeled structure of the mating portion 220 in the guide rail 202 allows the pulley assembly 100 to easily install to the guide rail 202 of the integrated module plate 200 for reducing its manufacturing process and costs.

In FIGS. 4 and 5, a first support surface 222 near each aperture 214 on the guide rail 202 is defined and configured for supporting the fingers 120 of the base element 102 when the pulley assembly 100 is installed to the guide rail 202 of the integrated module plate 200. The guide rail 202 also defines a second support surface 224 and a third support surface 226 at the area of the mating portion 220. As shown in FIG. 5, the second support surface 224 is on the internal edge of the slot 216 of the pulley assembly receiving site 210 and is configured for supporting a vertical surface 128 of the L-shaped stepped area 124. In addition, the third support surface 226 is located inside the mating portion 220 of the guide rail 202 and is configured for supporting the edge 126 of the stepped area 124. Accordingly, in an assembled configuration as shown in FIG. 2, the clipped-in pulley assembly 100 is retained to the integrated module plate 200 before the cable 30 is tensioned because of the interaction between the base element 102 of the pulley assembly 100 and the support surfaces 222, 224, 226 of the integrated module plate 200.

As shown in FIG. 5, the pulley assembly with integrated module plate 10 includes the cable 30 wrapping around the cable pulley 104. A resultant force F by the wrapped cable 30 around the cable pulley 104 of the pulley assembly 100 always acts in direction −Z as a result of the redirection of the driving force from the driving unit 40 (shown in FIG. 1). The force F acting on the cable pulley 104 in −Z direction leads to a high bending moment, which is transferred to the coupled base element 102 of the pulley assembly 100. In turns, the fingers 120 of the base element 102 exerts a first force A on the first support surface 222 of the guide rail 202, and the vertical surface 128 of the L-shaped stepped area 124 of the base element 102 exerts a second force B on the second support surface 224 of the slot 216. The edge 126 of the L-shaped stepped area 124 also exerts a third force C on the third support surface 226 of the C-channeled area of the mating portion 220. Accordingly, each of the forces A, B, C of the base elements 102 exerted by the resultant force F on the cable pulley 104 presses against each of the first, second and third support surface 222, 224, 226 of the pulley assembly receiving site 210. Accordingly, these forces are balanced to steadily secure the pulley assembly 100 to the integrated module plate 200 of the window regulator assembly 1.

The foregoing description of various forms of the invention has been presented for purposes of illustration and description. It is not intended to be exhaustive or to limit the invention to the precis forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:
1. A pulley assembly for use with an integrated module plate for redirecting a cable, comprising:
  a pulley assembly including;
    a base element having a body, a first portion and a second portion, the first portion having a finger and the second portion having a stepped area, and
    a cable pulley rotatably coupling with the base element for redirecting the cable; and
  an integrated module plate having a pulley assembly receiving site for coupling with the pulley assembly, the pulley assembly receiving site having an aperture for engaging with the finger, a slot for allowing the stepped area to pass through and a mating portion for engaging with an edge of the stepped area of the base element,
  wherein the mating portion includes a third support surface supporting the edge of the stepped area of the base element.

2. The pulley assembly for use with the integrated module plate of claim 1, wherein the finger of the base element is extended from the body in generally parallel to the pulley assembly receiving site and placed through the aperture of the pulley assembly receiving site.

3. The pulley assembly for use with the integrated module plate of claim 1, wherein the body of the base element includes a hole allowing a pulley screw to pass through when the cable pulley is rotatably attached to the base element.

4. The pulley assembly for use with the integrated module plate of claim 1, wherein the stepped area of the base element has a L-shape structure, and the L-shape stepped area is placed into the mating portion through the slot of the pulley assembly receiving site.

5. The pulley assembly for use with the integrated module plate of claim 1, wherein the base element further includes a cable retention tab generally extended from the body for preventing the cable from being removed from the cable pulley.

6. The pulley assembly for use with the integrated module plate of claim 1, wherein the mating portion of the pulley assembly receiving site has a C-shape channel structure and is configured for receiving the edge of the stepped area of the base element.

7. The pulley assembly for use with the integrated module plate of claim 1, wherein the pulley assembly receiving site further includes a first support surface near the aperture and a second support surface on the slot.

8. The pulley assembly for use with the integrated module plate of claim 7, wherein in an assembled configuration, the clipped-in pulley assembly is retained to the integrated module plate by engaging with the support surfaces before the cable is tensioned.

9. The pulley assembly for use with the integrated module plate of claim 8, wherein in the assembled configuration with the cable, a resultant force exerted by a driving force of the cable on the base element presses against each of the first, second and third support surfaces of the pulley assembly receiving site.

10. The pulley assembly for use with the integrated module plate of claim 1, wherein the cable pulley is arranged on the base element along a connecting axis extending in a direction from the cable pulley to the base element for mounting the cable pulley.

11. The pulley assembly for use with the integrated module plate of claim 3, wherein the cable pulley is rotatably mounted on an upper surface of the base element by the pulley screw, a washer and a nut.

12. The pulley assembly for use with the integrated module plate of claim 1, wherein the pulley assembly receiving site further includes a central opening for allowing the pulley assembly to place on the pulley assembly receiving site without interference when the pulley assembly is installed to the pulley assembly receiving site.

* * * * *